US012517935B2

(12) United States Patent
Lezcano et al.

(10) Patent No.: US 12,517,935 B2
(45) Date of Patent: Jan. 6, 2026

(54) SYSTEM AND METHOD FOR PERFORMING CROSS-LINGUAL PRODUCT SEARCHES

(71) Applicant: Walmart Apollo, LLC, Bentonville, AR (US)

(72) Inventors: Leonardo Lezcano, Rocklin, CA (US); Pankaj Appasaheb Adsul, WoodRidge, NJ (US); Jesus Perez Martin, Santiago (CL); Jorge Gomez Robles, Mexico City (MX); Krishna Sravanthi Rajanala Sai, Dublin, CA (US); Ciya Liao, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 280 days.

(21) Appl. No.: 18/103,651

(22) Filed: Jan. 31, 2023

(65) Prior Publication Data
US 2024/0256587 A1     Aug. 1, 2024

(51) Int. Cl.
G06F 16/3332    (2025.01)
G06F 40/263     (2020.01)
G06F 40/58      (2020.01)

(52) U.S. Cl.
CPC ........ *G06F 16/3337* (2019.01); *G06F 40/263* (2020.01); *G06F 40/58* (2020.01)

(58) Field of Classification Search
CPC ..... G06F 16/3337; G06F 40/263; G06F 40/58
See application file for complete search history.

(56) References Cited

U.S. PATENT DOCUMENTS 6,064,951 A *  5/2000  Park ................... G06F 16/3337
                                                    707/999.005
7,917,528 B1   3/2011  Dave et al.
(Continued)

FOREIGN PATENT DOCUMENTS

CA    2940551 C    10/2018
CN    104145270 A  11/2014
(Continued)

OTHER PUBLICATIONS

Yao, Liang, et al. "Exploiting neural query translation into cross lingual information retrieval." arXiv preprint arXiv:2010.13659 (2020). (Year: 2020).*
(Continued)

*Primary Examiner* — Brian L Albertalli
(74) *Attorney, Agent, or Firm* — FOLEY & LARDNER LLP

(57) ABSTRACT

A method can include determining a translatability class label and a class-associated search query for a cross-lingual search query. Determining the translatability class label and the class-associated search query can include determining whether a first class-translation pair for the cross-lingual search query exists in a memory module. If the first class-translation pair exists in the memory module, the method further can include retrieving the first class-translation pair for the cross-lingual search query from the memory module. When no class-translation pair for the cross-lingual search query exists in the memory module, the method additionally can include: determining the translatability class label, and determining the class-associated search query based on the translatability class label. The method further can include determining search results for the cross-lingual search query based on the translatability class label and the class-associated search query, and transmitting the search results to a
(Continued)

user based on the translatability class label. Other embodiments are disclosed.

20 Claims, 6 Drawing Sheets

(56) References Cited

U.S. PATENT DOCUMENTS

| | | | |
|---|---|---|---|
| 8,478,773 B1 | 7/2013 | Bryukhov et al. | |
| 8,478,779 B2 | 7/2013 | Bergstraesser et al. | |
| 8,543,563 B1* | 9/2013 | Nikoulina | G06F 40/42 |
| | | | 707/706 |
| 8,577,909 B1* | 11/2013 | Hodge | G06F 16/3338 |
| | | | 706/14 |
| 8,577,910 B1 | 11/2013 | Hodge | |
| 8,639,701 B1* | 1/2014 | Lim | G06F 16/3337 |
| | | | 707/748 |
| 9,824,147 B1* | 11/2017 | Gilliland | G06F 16/3337 |
| 10,699,082 B2 | 6/2020 | Bhagat | |
| 11,288,460 B2 | 3/2022 | Kurabayashi | |
| 11,373,049 B2 | 6/2022 | Johnson Premkumar et al. | |
| 2003/0229622 A1* | 12/2003 | Middelfart | G06F 16/3337 |
| | | | 707/E17.073 |
| 2004/0261021 A1 | 12/2004 | Mittal et al. | |
| 2008/0133479 A1 | 6/2008 | Zelevinsky et al. | |
| 2008/0235202 A1* | 9/2008 | Wang | G06F 16/3337 |
| | | | 707/E17.073 |
| 2008/0275691 A1* | 11/2008 | Summerlin | G06F 40/40 |
| | | | 707/E17.073 |
| 2009/0024613 A1 | 1/2009 | Niu | |
| 2009/0083243 A1 | 3/2009 | Heymans | |
| 2009/0193003 A1* | 7/2009 | Heymans | G06F 16/3337 |
| 2009/0204386 A1 | 8/2009 | Seligman et al. | |
| 2009/0222428 A1* | 9/2009 | Bode | G06F 16/3337 |
| 2010/0106704 A1* | 4/2010 | Josifovski | G06F 40/58 |
| | | | 704/7 |
| 2012/0158621 A1 | 6/2012 | Bennett et al. | |
| 2012/0233196 A1 | 9/2012 | Wu | |
| 2012/0330990 A1* | 12/2012 | Chen | G06F 16/3322 |
| | | | 707/E17.14 |
| 2014/0059030 A1 | 2/2014 | Hakkani-Tur | |
| 2014/0201202 A1 | 7/2014 | Jones | |
| 2014/0337005 A1* | 11/2014 | Abdel-Hady | G06F 16/35 |
| | | | 704/2 |
| 2015/0006505 A1 | 1/2015 | Plakhov et al. | |
| 2015/0178392 A1 | 6/2015 | Jockisch | |
| 2015/0234920 A1 | 8/2015 | Tawfik | |
| 2015/0347519 A1 | 12/2015 | Hornkvist | |
| 2016/0005196 A1 | 1/2016 | Awadallah et al. | |
| 2016/0203411 A1 | 7/2016 | Sadikov et al. | |
| 2017/0270101 A1* | 9/2017 | Kopru | G06F 16/2455 |
| 2017/0277683 A1 | 9/2017 | Bhagat | |
| 2018/0052885 A1 | 2/2018 | Gaskill et al. | |
| 2018/0067968 A1 | 3/2018 | Cheung | |
| 2018/0285444 A1 | 10/2018 | Joshi et al. | |
| 2019/0370392 A1* | 12/2019 | Cazin | G06F 16/334 |
| 2020/0142890 A1* | 5/2020 | Zhang | G06F 16/2452 |
| 2020/0342182 A1 | 10/2020 | Johnson Premkumar et al. | |
| 2022/0269853 A1 | 8/2022 | Itani | |
| 2023/0096070 A1 | 3/2023 | Skiles et al. | |
| 2023/0245199 A1 | 8/2023 | Mohiuddin et al. | |
| 2023/0281194 A1 | 9/2023 | Lezcano et al. | |
| 2023/0281257 A1 | 9/2023 | Chembolu et al. | |

FOREIGN PATENT DOCUMENTS

| | | |
|---|---|---|
| CN | 112446222 A | 3/2021 |
| JP | 6828582 B2 | 2/2021 |
| WO | 2013188504 A2 | 12/2013 |

OTHER PUBLICATIONS

Wang, Xuerui, et al. "Cross-lingual query classification: A preliminary study." Proceedings of the 2nd ACM workshop on Improving non english web searching. 2008. (Year: 2008).*

Hu, Rong, et al. "Mining Translations of Web Queries from Web Click-through Data." AAAI. 2008. (Year: 2008).*

Türe, Ferhan, and Elizabeth Boschee. "Learning to translate: a query-specific combination approach for cross-lingual information retrieval." Proceedings of the 2014 Conference on Empirical Methods in Natural Language Processing (EMNLP). 2014. (Year: 2014).*

Hu, Q., et al., "Query Transformation for Multi-Lingual Product Search," SIGIR eCom '20, Jul. 30, 2020, Virtual Event, China, webpage ,https://sigir-ecom.github.io/ecom2020/ecom20Papers/paper6.pdf>, published by ACM, New York, NY Jul. 30, 2020.

Berthiaume, D., "Exclusive Q&A: Walmart Combines Human, AI Insight for Spanish Search," webpage <https://chainstoreage.com/exclusive-qa-walmart-combines-human-ai-insight-spanish-search>, published by Ensemble IQ, CSA Jul. 28, 2022.

Mccarley, J. Scott, "Should we translate the documents or the queries in cross-language information retrieval?", Proceedings of the 37th Annual Meeting of the Association for Computational Linguistics, (Year: 1999), pp. 1-7.

McCarley, J. Scott. "Should we translate the documents or the queries in cross-language information retrieval?" Proceedings of the 37th Annual Meeting of the Association for Computational Linguistics. 1999. (Year: 1999) 1999.

* cited by examiner

600

610 Training a translatability classifier module to determine a translatability class label for a cross-lingual query

620 Determining, via the translatability classifier module, a translatability class label for a cross-lingual search query ($Q$) received

630 Training a language translator module based on domain-specific corpora

640 Determining, via the language translator module, a class-associated search query for $Q$ based on the translatability class label

650 Transmitting the class-associated search query to a monolingual search engine

FIG. 6

SYSTEM AND METHOD FOR PERFORMING CROSS-LINGUAL PRODUCT SEARCHES

TECHNICAL FIELD

This disclosure relates generally to techniques for cross-lingual searches.

BACKGROUND

In countries or regions where the popularity is diverse, it is common that users may search for products using cross-lingual search queries that include words from different languages. Moreover, sometimes two different languages may have the same word with different meanings in the respective languages, and even the same language may have multiple varieties of the same word. Without any hint from the user regarding the context of the search, the cross-lingual search queries and the ambiguity in search queries can cause a conventional search engine to guess the language incorrectly and produce irrelevant results. Therefore, systems and methods for processing cross-lingual search queries for a monolingual search engine are desired.

BRIEF DESCRIPTION OF THE DRAWINGS

To facilitate further description of the embodiments, the following drawings are provided in which:

FIG. 6 illustrates a flow chart for a method for processing cross-lingual search queries for performing product searches in FIG. 4, according to another embodiment.

Figure 1:
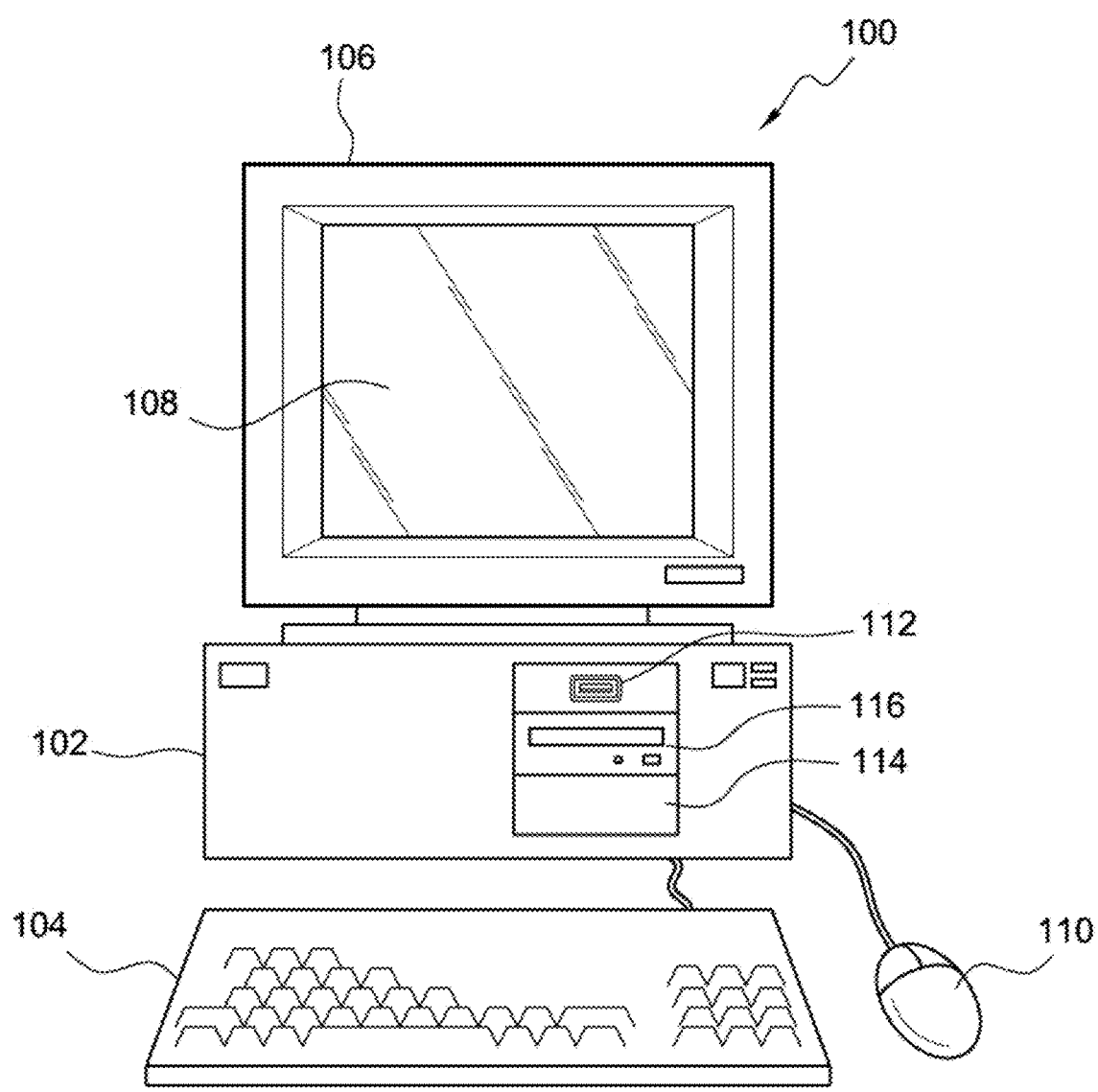
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
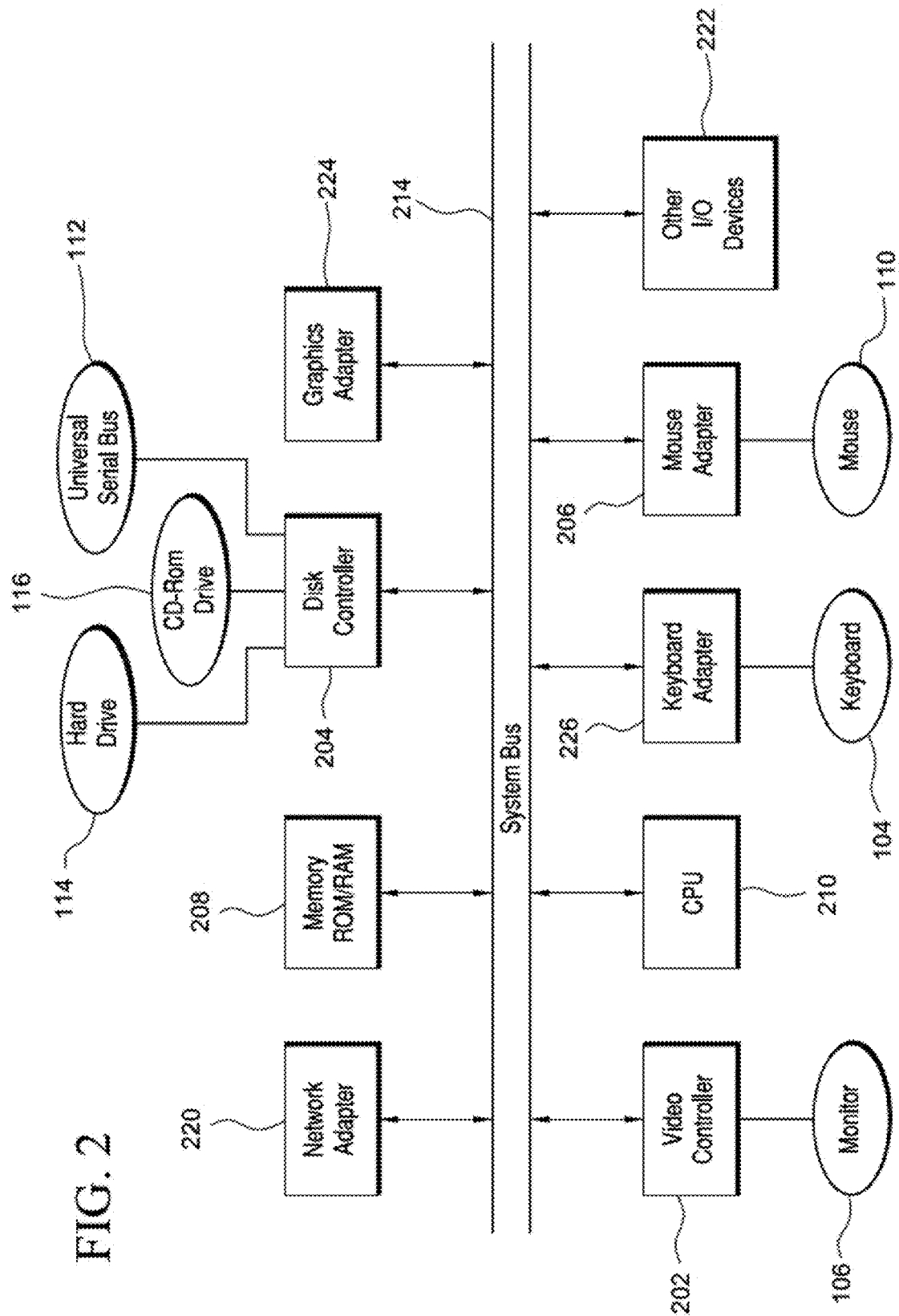
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
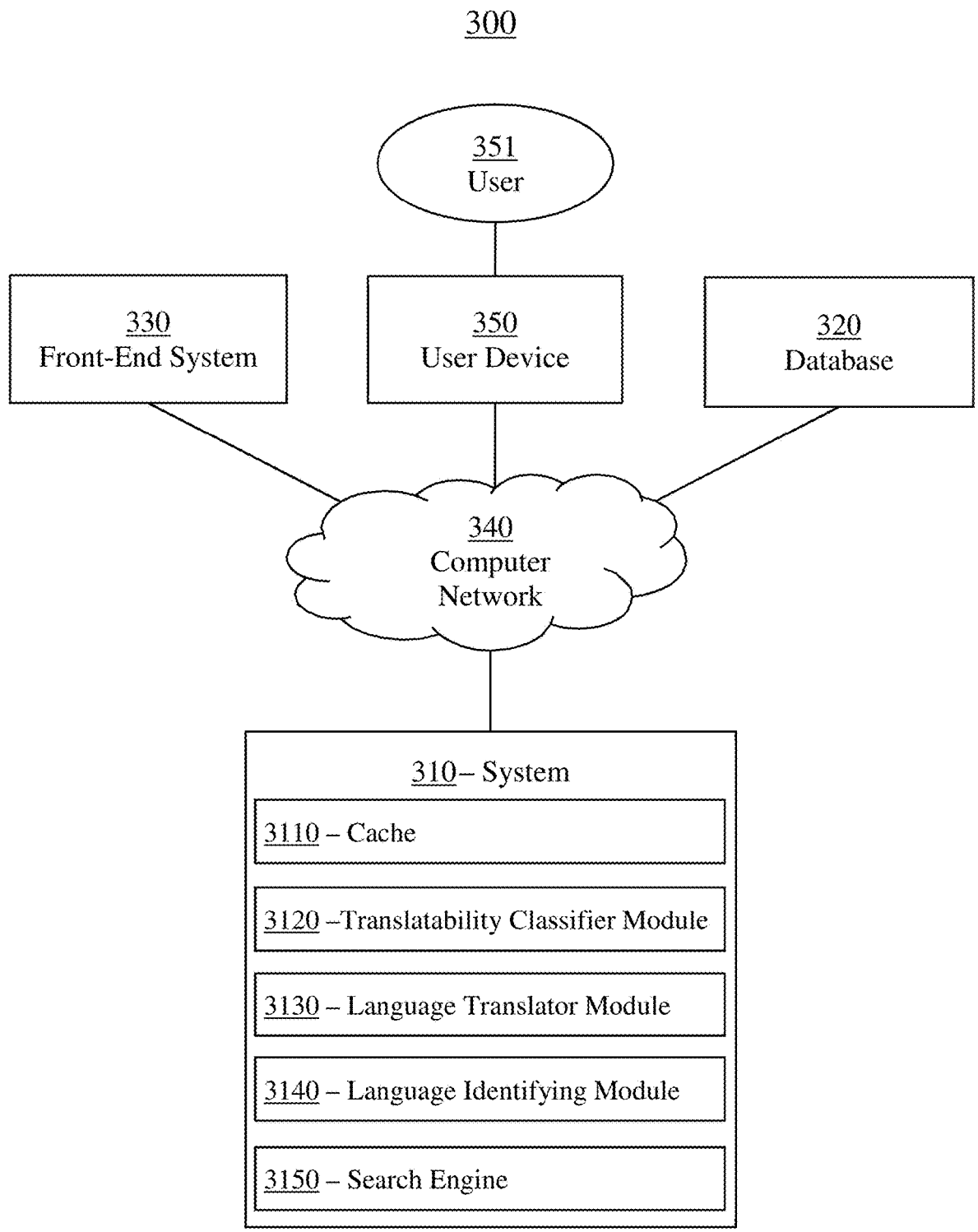
FIG. 3 illustrates a system for processing cross-lingual search queries and performing cross-lingual product searches, according to an embodiment.

Turning ahead in the drawings, FIG. 3 illustrates a block diagram for a system 300, according to an embodiment. In many embodiments, system 300 comprises one or more systems (e.g., a system 310), one or more databases (e.g., a database 320), one or more front-end systems (e.g., a front-end system 330), one or more computer networks (e.g., a computer network 340), and/or one or more user devices (e.g., a user device 350) for one or more users (e.g., a user 351). In a number of embodiments, system 300 or system 310 can process cross-lingual search queries and perform product searches accordingly. Examples of difficulties when translating cross-lingual search queries (involving English words and Spanish words to be translated into English words such as "cake de fresa" (strawberry cake) and "colchón queen" (queen mattress)) can include (1) cross-language ambiguity such as "white pan" where "pan" relates to cookware in English and bread in Spanish, (2) Spanish ambiguity such as "calabaza" in Spanish, which can be translated into pumpkin or squash in English, (3) translatability such as whether to translate or not after detecting Spanish such as "cuentos de hadas" losing its implicit Spanish intention if translated into English as fairy tales and "queso blanco" losing its intended meaning of a Latin American style of cheese if translated into English as white cheese, (4) non-translatable entities such as brands, movie titles, product lines, and names of sports teams, including "Corona" when referring to the beer brand should not be translated into crown in English, and (5) Spanish dialects such as "coche" in Spanish in Spain means car in English, but in Cuba means stroller in English, while "carro" in Spanish in Spain means stroller in English, but in Cuba means car in English.

Systems 300 and 310 are merely exemplary, and embodiments of systems 300 and 310 are not limited to the embodiments presented herein. Systems 300 and 310 can be employed in many different embodiments or examples not specifically depicted or described herein. In many embodiments, systems 300 and 310 can comprise one or more suitable systems, subsystems, servers, modules, elements, and/or models. In some embodiments, system 310 further can include a cache 3110, a translatability classifier module 3120, a language translator module 3130, a language identifying module 3140, search engine 3150, etc. (In many embodiments, cache 3110 can be any memory module, such as a database, a hard drive, random access memory, a cache, and the like.) In some embodiments, certain elements, modules, or systems of systems 300 and 310 can perform various procedures, processes, and/or activities. In other embodiments, the procedures, processes, and/or activities can be performed by other suitable elements, modules, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

In many embodiments, system 310, translatability classifier module 3120, language translator module 3130, language identifying module 3140, search engine 3150, database 320, and/or front-end system 330 can each be a computer system, such as computer system 100 (FIG. 1), as described above, and can each be a single computer, a single server, or a cluster or collection of computers or servers, or a cloud of computers or servers. In many embodiments, system 310 and front-end system 330 can each include one or more computer caches (e.g., cache 3110), and the one or more computer caches can each be a hardware or software component. In other embodiments, a single computer system can host system 310, translatability classifier module 3120, language translator module 3130, language identifying module 3140, search engine 3150, database 320, and/or front-end system 330. Additional details regarding system 310, cache 3110, translatability classifier module 3120, language translator module 3130, language identifying module 3140, search engine 3150, database 320, front-end system 330, and/or user device 350 are described herein.

In some embodiments, system 310 and/or each of its elements and/or modules (e.g., cache 3110, translatability classifier module 3120, language translator module 3130, language identifying module 3140, and/or search engine 3150) can be modules of computing instructions (e.g., software modules) stored at non-transitory computer readable media that operate on one or more processors. In these or other embodiments, system 310 and/or each of its elements and/or modules can be implemented in hardware or combination of hardware and software. In many embodiments, the operator and/or administrator of system 310 can manage system 310, the processor(s) of system 310, and/or the memory storage unit(s) of system 310 using the input device(s) and/or display device(s) of system 310.

In a number of embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

System 300, system 310, database 320, front-end system 330, and/or user device 350 can be implemented using any suitable manner of wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can be in data communication, through computer network 340, with front-end system 330 and/or user device 350. Computer network 340 can include one or more of a computer network, a telephone network, the Internet, and/or an internal network not open to the public (e.g., a private network and/or a virtual private network (VPN)), etc.

Meanwhile, in many embodiments, system 310 also can be configured to communicate with one or more databases (e.g., database 320). Examples of the one or more databases can include a product database that contains information about products, items, or SKUs (stock keeping units), for example, including attribute names and attribute values, among other information. Other exemplary databases can include a training dataset database for storing historical, processed, and/or synthesized data for training one or more modules (e.g., translatability classifier module 3120, language translator module 3130, language identifying module 3140, and/or search engine 3150). Further, the one or more databases can include a model repository database for storing configurations and/or parameters for configuring and/or operating one or more systems (e.g., system 310 and/or front-end system 330) and/or modules (e.g., translatability classifier module 3120, language translator module 3130, language identifying module 3140, and/or search engine 3150).

In some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

In a number of embodiments, front-end system 330 can host one or more websites and/or mobile application servers that interface with an application (e.g., a mobile application, a web browser, or a chat application) on a consumer device for a consumer (not shown) or on user device 350 for user 351. In other examples, front-end system 330 further can support back-office applications, including receiving inputs from user devices (e.g., user device 350), managing orders, inventory, and/or supply, processing payments, and so forth.

In some embodiments, user device 350 can be used by one or more users (e.g., user 351) to interface with system 310 and/or front-end system 330. For example, user device 350 can, via various user interfaces (e.g., webpages or applications, etc.), transmit commands from user 351 to system 310 and/or production system 330, and receive responses and/or notices from system 310 and/or production system 330 to be presented to user 351.

In certain embodiments, user device 350 can be desktop computers, laptop computers, mobile devices, and/or other endpoint devices used by one or more users (e.g., user 351). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

Figure 4:
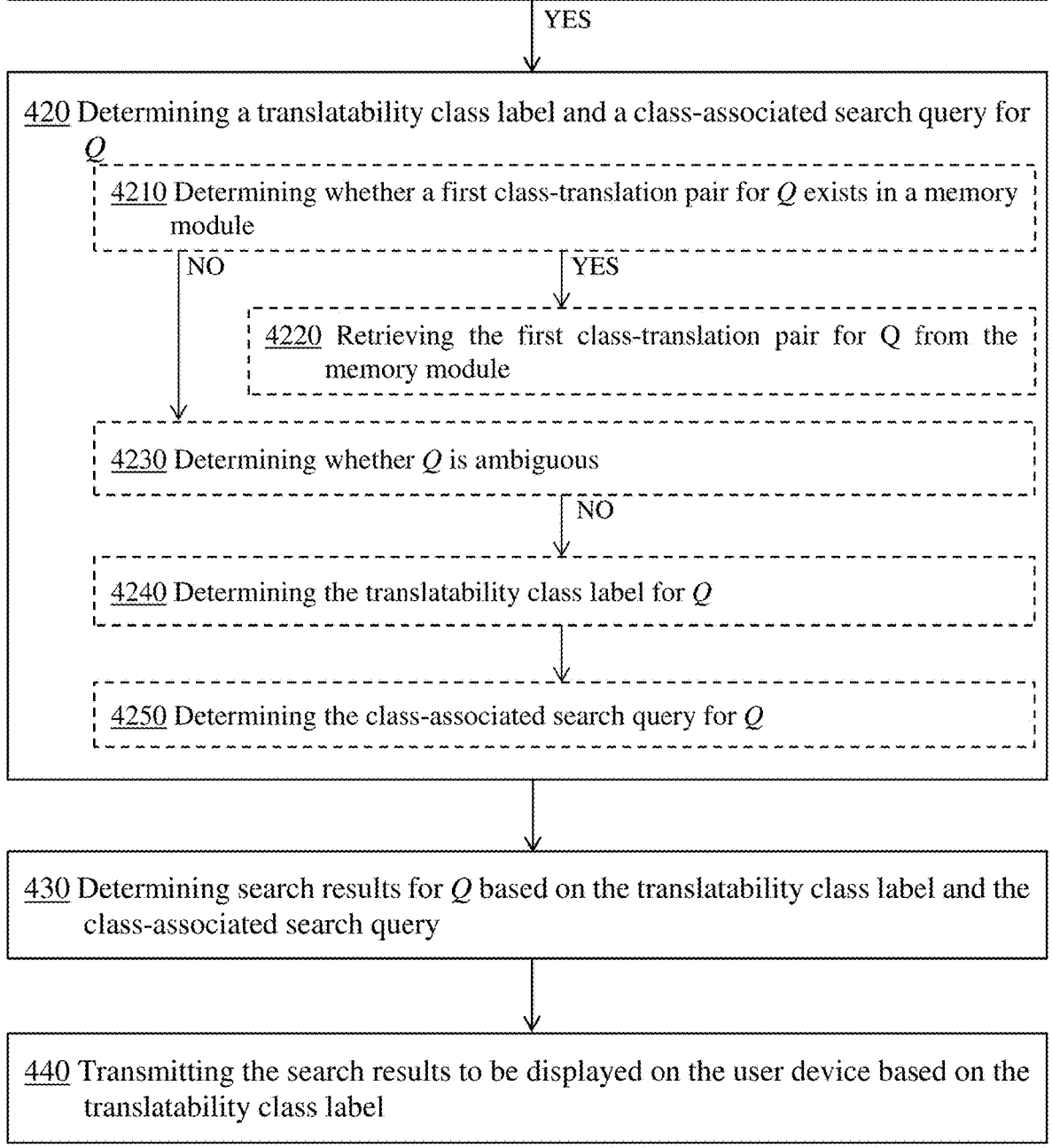
FIG. 4 illustrates a flow chart for a method for performing cross-lingual product searches, according to an embodiment.

Turning ahead in the drawings, FIG. 4 illustrates a flow chart for a method 400 for performing cross-lingual product searches, according to an embodiment. In many embodiments, method 400 can be implemented via execution of computing instructions on one or more processors. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3) and/or system 310 (FIG. 3) (including the modules) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3) (including the modules). The processor(s) can be similar or identical to the processor(s) described above with respect to computer system 100 (FIG. 1).

In many embodiments, method 400 can include determining whether a search query received is cross-lingual (block 410). A search query is cross-lingual when it includes at least a word in a second language that is different from a primary language for a search engine. The search query can be received, via a computer network (e.g., computer network 340 (FIG. 3)), from a user device (e.g., user device 350 (FIG. 3)) for a user (e.g., user 351 (FIG. 3)). Block 410 can determine whether the search query is cross-lingual by a pre-trained language identifying module (e.g., language identifying module 3140 (FIG. 3), a text classification model, a fastText model, etc.). Block 410 alternatively or additionally can determine whether the search query is cross-lingual based on whether the input search query includes at least a second-language token (e.g., a word in a second language but not in the primary language) in a domain-specific lexicon (e.g., a lexicon including retail-related terms in the second language).

When the search query is determined in block 410 to be cross-lingual, method 400 further can include determining a translatability class label and a class-associated search query for the cross-lingual search query (block 420). The translatability class label can be associated with a user intention, to be predicted in block 420, about whether a translation for the cross-lingual search query is desired. The class-associated search query can be the input for a search engine (e.g., search engine 3150 (FIG. 3)), to be determined based on the translatability class label or the user's intent. In number of embodiments, translatability class labels can include "OptIn", "OptOut", and "Ignore".

For example, in some embodiments, when block 420 determines that the user likely does not want an input search query to be translated, the translatability class label for the search query can be OptIn, and the class-associated search query to be used by the search engine (e.g., search engine 3150 (FIG. 3)) can include the input search query. For example, when the cross-lingual search query is "queso blanco" in Spanish, and when the translatability class label is OptIn because the term "queso blanco" is commonly used in the country, the class-associated search query can be "queso blanco" (identical to the cross-lingual search query). When block 420 determines that the user likely wants an input search query to be translated, the translatability class label for the search query can be OptOut, and the class-associated search query to be used by the search engine can include the input search query, without translation. For example, when the cross-lingual search query is "camarones congelados" in Spanish and the translatability class label is OptOut, the class-associated search query can be "frozen shrimp" (the cross-lingual search query translated to English).

When block 420 determines that the user very likely (e.g., a 95% or 99% probability) does not want an input search query to be translated, the translatability class label for the search query can be Ignore, and the class-associated search query to be used by the search engine can include the input search query, without translation. For example, when the cross-lingual search query is "corona beer" and the translatability class label is Ignore because "corona" is a known second-language token (e.g., a brand for beer), the class-associated search query can be "corona beer" (identical to the cross-lingual search query). In several embodiments, the translatability class label can be "Ignore" only when the respective probability of the cross-lingual search query associated with Ignore is greater than the respective probability associated with OptIn, the respective probability associated with OptOut, and an Ignore threshold (e.g., 97% or 99%). In certain embodiments, block 420 can predict the user's intent based on historical data associated with users in general and/or the user's historical data.

In many embodiments, block 420 further can include determining whether a first class-translation pair for the cross-lingual search query exists in a memory module (e.g., cache 3110 (FIG. 3)) (block 4210). Each class-translation pair in the memory module can include a respective class label (e.g., OptIn or OptOut) and a respective translation previously performed on a historical cross-lingual search query. For example, a class-translation pair in the memory module can be [OptOut, "strawberry cake"] for a cross-lingual search query "cake de fresa". In another example, a class-translation pair in the memory module can be [OptIn, "white cheese"] for a cross-lingual search query "queso blanco". In many embodiments, each class-translation pair can expire in a certain time period (e.g., 7 days). In a few embodiments, block 4210 further can determine how many class-translation pairs for the cross-lingual search query can be found in the memory module. Generally, a class-translation pair in the memory module corresponds to a search query. Nonetheless, when a search query is ambiguous in whether a translation is needed or desired, two or more class-translation pairs for the search query can be stored in the memory module. More details about the type of ambiguity and how to determine ambiguity are described in block 4230.

In a number of embodiments, after determining that the first class-translation pair for the cross-lingual search query exists in the memory module in block 4210, block 420 also can include retrieving the first class-translation pair for the cross-lingual search query from the memory module (block 4220). Then the translatability class label for the cross-lingual search query can include the respective class label for the first class-translation pair, and the class-associated search query for the cross-lingual search query can include the respective translation for the first class-translation pair.

Upon determining that no class-translation pair for the cross-lingual search query can be found in the memory module in block 4210, block 420 further can include determining whether the cross-lingual search query is ambiguous (block 4230). If the cross-lingual search query is ambiguous, block 420 can return a failure and terminate method 400 or cause an system operator, a model, and/or a remote server (e.g., the system or method in U.S. patent application Ser. No. 17/588,599, which is incorporated by reference in its entirety, or a Bi-directional Long-Short Term Memory (BiLSTM) model, etc.) to resolve the ambiguity issue in the search query. In certain embodiments where the system operator, the model, or the remote server can provide one or more unambiguous candidate search queries to resolve the ambiguity, block 420 can proceed to determine the translatability class label and the class-associated search query for each of the one or more unambiguous candidate search queries, and save the one or more class-translation pairs for the one or more unambiguous candidate search queries to the memory module.

Further, in some embodiments, block 4210 can determine whether the cross-lingual search query is ambiguous based on whether at least one additional class-translation pair for the cross-lingual search query exists in the memory module, as determined in block 4210. In many embodiments, block 4210 further can determine an ambiguity type among one or more of potential ambiguity types for the cross-lingual search query. The potential ambiguity types can include a cross-language ambiguity and a second-language-variety ambiguity. For example, when the same term (e.g., "pan") has different meanings in the primary language (e.g., "pan", a type of cookware in English) and the second language (e.g., "bread" in Spanish) in the domain (e.g., retail), the ambiguity type is a cross-language ambiguity. When the second language includes multiple second language varieties (e.g., Spanish in different regions of Latin America) and the same term (e.g., "calabaza") can be translated into different English terms (e.g., "pumpkin" and "squash"), the ambiguity type is the second-language-variety ambiguity.

Moreover, block 4210 can determine the ambiguity type based on a respective distance between a first product category for the cross-lingual search query and a second product category for a translated search query for the cross-lingual search query, as translated by the search engine (e.g., search engine 3150 (FIG. 3)). The respective distance can be determined based on any suitable approaches (e.g., a distance across hierarchical departments for a retailer, a predefined distance between product categories, etc.).

In some embodiments, block 4210 further can determine the ambiguity type by determining a first respective user intention for each of the cross-lingual search query and the translated search query. The first respective user intention can be determined based on first respective user interaction rates (e.g., click-through rates (e.g., rates or chances that a user who sees a hyperlink with an item title or icon, or anything to that effect, would click on the hyperlink to see full the item listing) and/or purchases rates) for the cross-lingual search query and the translated search query. If it is not apparent that more user interactions (e.g., clicks or purchases) can be expected for one query between the cross-lingual search query and the translated search query than the other, based on the respective user interaction counts or rates for the cross-lingual search query and the translated search query and a first interaction difference threshold (e.g., 10%, 30%, etc.), block 4210 can determine that the ambiguity type is a cross-lingual ambiguity. For example, if historical data show that the respective historical number of user interactions with the respective search results (e.g., search results for the cross-lingual query and the translated query) are not significantly different (e.g., the difference being greater than the interaction difference threshold) when users were presented with the respective search results, then block 4210 can determine that the ambiguity type is a cross-lingual ambiguity.

In several embodiments, block 4210 also can determine the ambiguity type by determining a second respective user intention for each of multiple translations for the cross-lingual search query. The second respective user intentions can be determined based on second respective user interaction rates (e.g., click-through rates and/or purchases rates) for each of the second language varieties. If the difference between the second respective user intentions for some of the multiple translations are insignificant (e.g., less than a second interaction difference threshold (e.g., 10%, 18%, etc.)), then block 4210 can determine that the ambiguity type is a second-language-variety ambiguity.

In many embodiments, block 420 further can include determining the translatability class label (e.g., "Ignore", "OptIn", or "OptOut") for the cross-lingual search query (block 4240). Block 420 can use a translatability classifier module (e.g., translatability classifier module 3120 (FIG. 3), a fastText model, etc.) to determine the translatability class label for the cross-lingual search query. In many embodiments, the translatability classifier module can be trained based on a training dataset comprising labeled historical queries.

In a number of embodiments, block 420 additionally can include determining the class-associated search query for the cross-lingual search query (block 4250). The class-associated search query for the cross-lingual search query can be determined based on the translatability class label, determined in block 4240. In some embodiments, block 4250 can use a language translator module (e.g., language translator module 3130 (FIG. 3), or a Neural Machine Translation (NML) module, such as Tiny, Untied, Opus-MT, m2m100_418M, and Bergamot, etc.) trained based on domain-specific corpus or corpora to determine the class-associated search query for the cross-lingual search query. The language translator module can be trained to determine the class-associated search query (e.g., a translated or untranslated cross-lingual search query) based on the translatability class label.

In some embodiments, method 400 further can include determining search results for the cross-lingual search query based on the translatability class label and the class-associated search query (block 430). For example, as stated above, when the translatability class label is OptIn, the class-associated search query (e.g., the input for search engine 3150 (FIG. 3)) can the original cross-lingual search query.

When the translatability class label is OptOut, the class-associated search query can be the translated cross-lingual search query.

In a few embodiments, when the cross-lingual search query is determined to be ambiguous, block 430 further can include determining additional search results based on the respective class label and the respective translation of the at least one additional class-translation pair for the ambiguous cross-lingual search query. For example, when the cross-lingual search query is a cross-lingual ambiguity, the cross-lingual search query can be associated to two class-translation pairs, the first class-translation pair including the translated cross-lingual search query and the additional class-translation pair including the original cross-lingual search query, and the class-translation pairs can be retrieved in block 4220 or determined in block 4230 (manually or by a remote system).

In a number of embodiments, method 400 further can including transmitting, via the computer network 340 (FIG. 3)), the search results to be displayed on the user device (e.g., user device 350 (FIG. 3)) based on the translatability class label (block 440). For example, when the translatability class label is OptIn, OptOut, or Ignore, the search results can be the outcome of the search engine (e.g., search engine 3150 (FIG. 3)) for single class-associated search query. When the cross-lingual search query is determined to be ambiguous, transmitting the search results determined in block 430 further comprises transmitting, via the computer network (e.g., computer network 340 (FIG. 3)), the additional search results (e.g., the search results for the respective translation of the at least one additional class-translation pair) to be displayed on the user device separately from the search results.

For example, the additional search results can be displayed on a first page of the search results while the search results can be displayed on a second page of the search results, or vice versa. In another example, the additional search results and the search results can be displayed on the same web page of the search results, but in different delineated portions of the same web page. In a further example, the additional search results and the search results can be displayed on the same web page of the search results, but the additional search results can be displayed towards the top of the web page in a list of search results while the search results can be displayed towards a bottom of the web page in the same list of search results, or vice versa. In many embodiments, block 440 can cause the display of the search results and the additional search results on the user interface.

Figure 5:
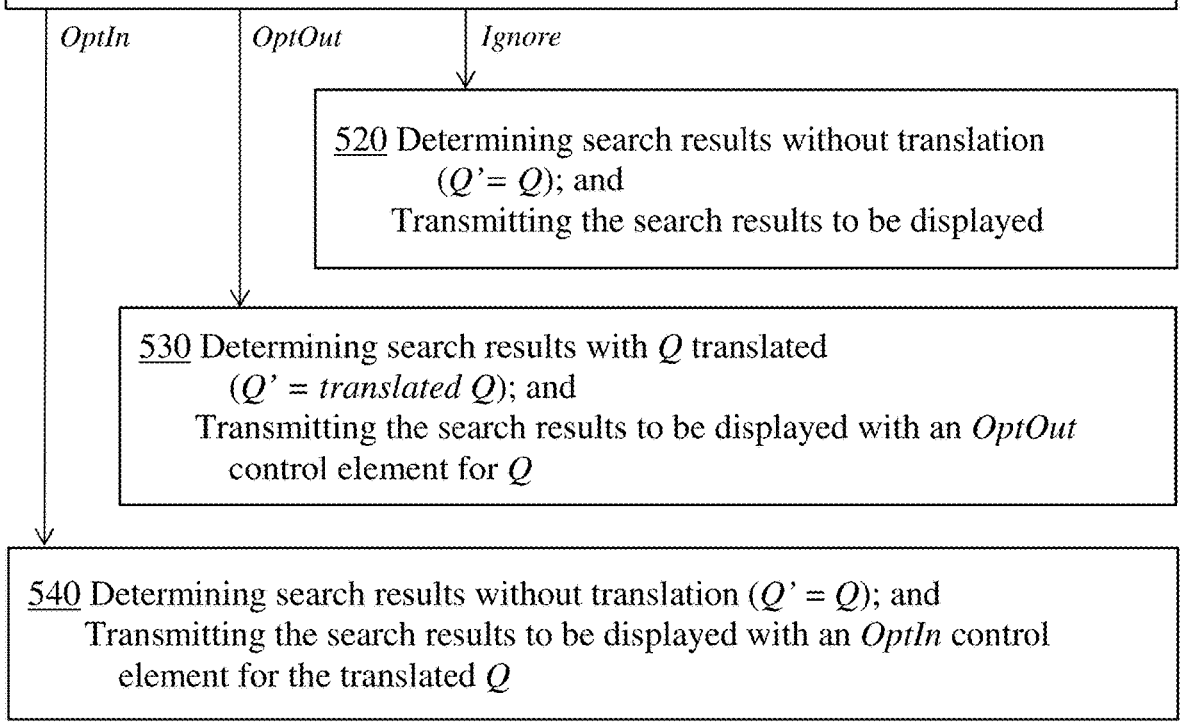
FIG. 5 illustrates a flow chart for a method for determining content to be displayed with the search results in FIG. 4, according to an embodiment.

Turning ahead in the drawings, FIG. 5 illustrates a flow chart for a method 500 for determining content to be displayed with search results of a cross-lingual product search, according to an embodiment. In many embodiments, method 500 can be implemented via execution of computing instructions on one or more processors. Method 500 is merely exemplary and is not limited to the embodiments presented herein. Method 500 can be employed in many different embodiments or examples not specifically depicted or described herein. In some embodiments, the procedures, the processes, the activities, and/or the blocks of method 500 can be performed in the order presented. In other embodiments, the procedures, the processes, the activities, and/or the blocks of method 500 can be performed in any suitable order. In still other embodiments, one or more of the procedures, the processes, the activities, and/or the blocks of method 500 can be combined or skipped.

In many embodiments, system 300 (FIG. 3) and/or system 310 (FIG. 3) (including the modules thereof) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3) (including the modules). The processor(s) can be similar or identical to the processor(s) described above with respect to computer system 100 (FIG. 1).

In a number of embodiments, method 500 can include determining a translatability class label and a class-associated search query for a cross-lingual search query (block 510). The cross-lingual search query can be received, via a computer network (e.g., computer network 340 (FIG. 3)), from a user device (e.g., user device 350 (FIG. 3)) for a user (user 351 (FIG. 3)). Block 510 can be similar or identical to block 420 (FIG. 4). In certain embodiments. block 510 can include one or more of blocks 4210, 4220, 4230, 4240, and/or 4250 and perform one or more similar functions or activities of blocks 4210, 4220, 4230, 4240, and/or 4250.

When the translatability class label determined in block 510 is Ignore, method 500 further can include: (a) determining, by a search engine (e.g., search engine 3150 (FIG. 3)), search results without translation (e.g., the class-associated search query comprises the cross-lingual search query); and (b) transmitting, via a computer network (e.g., computer network 340 (FIG. 3)), the search results to be displayed on a user interface for the user (block 520). In a number of embodiments, when a search query is labeled as Ignore, it means that there is a solid probability that the search query is completely in the primary language (except for some non-translatable tokens), block 510 can confidently provide for display only the search results without options for the user to choose to translate.

In several embodiments, when the translatability class label determined in block 510 is OptOut, method 500 further can include: (a) determining search results with the cross-lingual search query translated (e.g., the class-associated search query comprising the cross-lingual search query translated from the second language to the primary language); and (b) transmitting, via the computer network, the search results to be displayed with an OptOut control element (e.g., a button or a hyperlink with a title or icon for OptOut) on the user interface for the user (block 530). The OptOut control element can provide an alternative for a user when the user finds the search results unsatisfactory and would like to try the original, untranslated search query. For example, the OptOut control element can include the original cross-lingual search query, and when activated by the user (e.g., clicking or causing to execute), can be configured to cause another search for the cross-lingual search query.

In some embodiments, determining the class-associated search query for the cross-lingual search query in block 530 further can include: (a) using the language translator module (e.g., language translator module 3130 (FIG. 3)) to translate, at least in part, the cross-lingual search query from the second language to the primary language; and (b) determining that the class-associated search query comprises the cross-lingual search query, as translated in (a).

In several embodiments, when the translatability class label determined in block 510 is OptOut, method 500 further can include: (a) determining search results without translation (e.g., the class-associated search query comprising the cross-lingual search query); and (b) transmitting, via the computer network, the search results to be displayed with an OptIn control element (e.g., a button or a hyperlink with a title or icon for OptIn) for the translated cross-lingual search query (block 540). The OptIn control element can allow the user to force method 500 to provide search results based on a translation of the cross-lingual search query.

In a few embodiments, determining search results without translation further in block 540 further can include: (a) determining that the class-associated search query comprises the cross-lingual search query; (b) using the language translator module (e.g., language translator module 3130 (FIG. 3)) to translate, at least in part, the cross-lingual search query from a second language to a primary language; and (c) determining that a to-be-displayed translation comprises the cross-lingual search query, as translated. Further, the OptIn control element in block 540 can include the to-be-displayed translation, and, when activated by the user, can be configured to cause a search for the to-be-displayed translation.

Turning ahead in the drawings, FIG. 6 illustrates a flow chart for a method 600 for processing cross-lingual search queries before performing product searches, according to an embodiment. In many embodiments, method 600 can be implemented via execution of computing instructions on one or more processors. Method 600 is merely exemplary and is not limited to the embodiments presented herein. Method 600 can be employed in many different embodiments or examples not specifically depicted or described herein. In some embodiments, the procedures, the processes, the activities, and/or the blocks of method 600 can be performed in the order presented. In other embodiments, the procedures, the processes, the activities, and/or the blocks of method 600 can be performed in any suitable order. In still other embodiments, one or more of the procedures, the processes, the activities, and/or the blocks of method 600 can be combined or skipped.

In many embodiments, system 300 (FIG. 3) and/or system 310 (FIG. 3) (including the elements and/or modules thereof) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3) (including the modules). The processor(s) can be similar or identical to the processor(s) described above with respect to computer system 100 (FIG. 1).

Referring to FIG. 6, in a number of embodiments, method 600 can include training a translatability classifier module (e.g., translatability classifier module 3120 (FIG. 3), a fast-Text model, etc.) to determine a translatability class label (e.g., OptIn, OptOut, and/or Ignore) for a cross-lingual query (block 610). In a few embodiments, the translatability classifier module further can be trained to determine the translatability class label among multiple translatability class labels associated with user intentions for the cross-lingual search query based on a respective probability of the cross-lingual search query being associated with each of the multiple translatability class labels. That is, to determine a label from OptIn, OptOut, and Ignore for a search query, the translatability classifier module, as trained, can determine a respective probability for each of the 3 labels, OptIn, OptOut, and Ignore, and select one from the 3 labels based on the 3 probabilities. Further, block 610 can train the translatability classifier module based on a training dataset comprising labeled historical queries. The training can be supervised or semi-supervised. Each of the labeled historical queries can be labeled based at least in part on respective historical user interactions (e.g., purchases or clicks) with a respective query of the each of the labeled historical queries.

In many embodiments, the more the search results lead to purchases, the more likely that the labels for the search queries are correct. Further, in several embodiments, the more often the control element (e.g., a button) associated with an OptIn search query is interacted with or clicked, the more likely that the prediction that the user might not want the search query to be translated, thus the OptIn label, is incorrect. Similarly, the more often the control element associated with an OptOut search query is interacted with, the more likely that the prediction that the user might want the search query to be translated, thus the OptOut label, is incorrect. The respective historical user interactions with the respective query of each of the labeled historical queries can include one or more of: (a) respective historical purchases associated with the respective query (e.g., purchase rates for the search results for the respective query); or (b) respective historical clicks on user interface controls associated with a respective label for the each of the labeled historical queries (e.g., click counts or click-through rates for an OptIn or OptOut button or hyperlink on the webpage for the search results for a query labeled as OptIn or OptOut, etc.).

In a number of embodiments, before training the translatability classifier module, method 600 or block 610 further can include one or more activities to pre-process the training dataset for the translatability classifier module. The pre-processing activities can include balancing a distribution of the labeled historical queries among the multiple translatability class labels (e.g., OptIn, OptOut, and Ignore) because most historical search queries are not cross-lingual and labeled as Ignore and also because the translatability classifier module, if trained on unbalanced training data, can produce skewed predictions. In some embodiments, balancing the distribution of the labeled historical queries among the multiple translatability class labels can include: (a) determining a minority class (e.g., OptIn or OptOut) of the labeled historical queries based on a respective label for each of the labeled historical queries; and (b) oversampling the minority class, as determined.

Block 610 further can refine and finalize the initial training of the translatability classifier module after a pre-defined number of iterations (e.g., 50, 100, 200, 350, etc.) for training the translatability classifier module (e.g., translatability classifier module 3120 (FIG. 3)). In several embodiments, after training the translatability classifier module in the predefined number of iterations, block 610 can refine the hyper-parameters for the translatability classifier module based on a second training dataset (e.g., historical queries different from those in the labeled historical queries in the training dataset), using any suitable algorithms or models (e.g., Bayesian Optimization using the SMAC3 toolkit, etc.).

Still referring to FIG. 6, in many embodiments, method 600 further can include determining, via the translatability classifier module, a translatability class label for a cross-lingual search query received (block 620). Block 620 can be similar or identical to block 4240 (FIG. 4). Furthermore, method 600 can include training a language translator module (e.g., language translator module 3130 (FIG. 3), a Tiny. Untied model, an Opus-MT model, a m2m100_418M model, a BergamotLarge model, etc.) based on one or more domain-specific corpora.

In some embodiments, the one or more domain-specific corpora can include a query-to-item-driven corpus comprising non-translatable tokens determined based in part on item textual features (e.g., title, brand, model, sport team, description, etc.) of highly engaged items (e.g., items with high click-through rates). A non-translatable token can be inferred from the intersection of the token in the textual features (e.g., titles, brands, descriptions, etc.) of items. Further, when a query including a token is to be translated, the token can be masked and not translated. In certain embodiments, method 600 or block 620 can determine the non-translatable tokens of the query-to-item-driven corpus based on terms common in historical search queries and the item textual features for highly engaged items of items in a database (e.g., database 330 (FIG. 3)) that includes a respective click-through rate that is greater than a click-through threshold (e.g., 30%, 50%, etc.).

In several embodiments, the one or more domain-specific corpora further can include a back-translation-driven corpus comprising item titles in a product catalog (e.g., database 330 (FIG. 3)) back-translated from a primary language (e.g., English) to a second language (e.g., Spanish). This corpus includes titles that include non-translatable tokens and titles where the same tokens are translated in order to provide contextual information for the language translator module to be trained.

In a number of embodiments, the one or more domain-specific corpora further can include a human-driven corpus comprising one or more of: (a) terms in second-language varieties, or (b) corrected translations, that are entered manually. The human-driven corpus can be used to overwrite erroneous translations in the other corpus or corpora (e.g., the query-to-item-driven corpus and/or the back-translation-driven corpus).

Still referring to FIG. 6, in many embodiments, method 600 further can include determining, via the language translator module (e.g., language translator module 3130 (FIG. 3)), a class-associated search query (e.g., translated or untranslated) for the cross-lingual search query based on the translatability class label as determined in block 620 or 4240 (FIG. 4) (block 640). For example, if the translatability class label is OptIn or Ignore, block 640 can determine that the class-associated search query comprises the cross-lingual search query, untranslated. If the translatability class label is OptOut, block 640 can determine that the class-associated search query comprises the cross-lingual search query, translated by the language translator module.

In a number of embodiments, method 600 also can include transmitting the class-associated search query to a monolingual search engine (e.g., search engine 3150 (FIG. 3)), based on the translatability class label (block 650). Block 650 can be similar or identical to block 440 (FIG. 4). In a few embodiments, block 650 further can include blocks 520, 530, and/or 540 in FIG. 5.

Various embodiments can include a system for performing cross-lingual product searches. The system can include one or more processors and one or more non-transitory computer-readable media storing computing instructions that, when executed on the one or more processors, cause the one or more processors to perform various acts. In many embodiments, the acts can include determining a translatability class label and a class-associated search query for a cross-lingual search query received, via a computer network, from a user device for a user. Determining the translatability class label and the class-associated search query for the cross-lingual search query further can include determining whether a first class-translation pair for the cross-lingual search query exists in a memory module. Each class-translation pair in the memory module can include a respective class label and a respective translation.

Upon determining that the first class-translation pair for the cross-lingual search query exists in the memory module, determining the translatability class label and the class-associated search query for the cross-lingual search query also can include retrieving the first class-translation pair for the cross-lingual search query from the memory module. The translatability class label for the cross-lingual search query can include the respective class label for the first class-translation pair, and the class-associated search query for the cross-lingual search query comprises the respective translation for the first class-translation pair.

Upon determining that no class-translation pair for the cross-lingual search query exists in the memory module, determining the translatability class label and the class-associated search query for the cross-lingual search query additionally can include: (a) determining, via a translatability classifier module, the translatability class label for the cross-lingual search query; and (b) determining, via a language translator module, the class-associated search query for the cross-lingual search query based on the translatability class label.

In many embodiments, the acts further can include determining search results for the cross-lingual search query based on the translatability class label and the class-associated search query. Then the acts additionally can include transmitting, via the computer network, the search results to be displayed on the user device based on the translatability class label.

Further, various embodiments can include a method being implemented via execution of computing instructions configured to run at one or more processors and stored at one or more non-transitory computer-readable media. The method can include one or more acts performed in the system above. For example, the method can include determining a translatability class label and a class-associated search query for a cross-lingual search query received, via a computer network, from a user device for a user. Determining the translatability class label and the class-associated search query for the cross-lingual search query further can include determining whether a first class-translation pair for the cross-lingual search query exists in a memory module. Each class-translation pair in the memory module can include a respective class label and a respective translation.

Upon determining that the first class-translation pair for the cross-lingual search query exists in the memory module, determining the translatability class label and the class-associated search query for the cross-lingual search query also can include retrieving the first class-translation pair for the cross-lingual search query from the memory module. The translatability class label for the cross-lingual search query can include the respective class label for the first class-translation pair, and the class-associated search query for the cross-lingual search query comprises the respective translation for the first class-translation pair.

Upon determining that no class-translation pair for the cross-lingual search query exists in the memory module, determining the translatability class label and the class-associated search query for the cross-lingual search query additionally can include: (a) determining, via a translatability classifier module, the translatability class label for the cross-lingual search query; and (b) determining, via a language translator module, the class-associated search query for the cross-lingual search query based on the translatability class label.

In many embodiments, the method further can include determining search results for the cross-lingual search query based on the translatability class label and the class-associated search query. In some embodiments, the method additionally can include transmitting, via the computer network, the search results to be displayed on the user device based on the translatability class label.

Various embodiments further can include another system for processing cross-lingual search queries for product searches. The system can include one or more processors and one or more non-transitory computer-readable media storing computing instructions that, when executed on the one or more processors, cause the one or more processors to perform various acts. In many embodiments, the acts can include determining, via a translatability classifier module, a translatability class label for a cross-lingual search query received, via a computer network, from a user device for a user. The translatability classifier module can be trained to determine the translatability class label among multiple translatability class labels associated with user intentions for the cross-lingual search query based on a respective probability of the cross-lingual search query being associated with each of the multiple translatability class labels.

In many embodiments, the acts further can include determining, via a language translator module, a class-associated search query for the cross-lingual search query based on the translatability class label, as determined. In several embodiments, the acts also can include transmitting, via the computer network, the class-associated search query to a monolingual search engine.

Various embodiments also can include another method being implemented via execution of computing instructions configured to run at one or more processors and stored at one or more non-transitory computer-readable media. The method can include one or more acts performed in the system above. The method can include determining, via a translatability classifier module, a translatability class label for a cross-lingual search query received, via a computer network, from a user device for a user. The translatability classifier module can be trained to determine the translatability class label among multiple translatability class labels associated with user intentions for the cross-lingual search query based on a respective probability of the cross-lingual search query being associated with each of the multiple translatability class labels.

In many embodiments, the method further can include determining, via a language translator module, a class-associated search query for the cross-lingual search query based on the translatability class label, as determined. In several embodiments, the method additionally can include transmitting, via the computer network, the class-associated search query to a monolingual search engine.

As explained herein, various embodiments of systems and methods can leverage domain adaptation for neural machine translations to make both latency and accuracy suitable for an e-commerce search. The neural machine translations can be find-tuned on a domain specific corpus based on engagement data and expanded with product catalog back-translation techniques. These embodiments can improve the relevance of search query results by, for example, translating Spanish queries to English before delivering the queries to the search engine, and these embodiments also can reduce polysemy-derived problems, high latency and context scarcity problems in such searches by reducing the presence of non-translatable entities, ambiguous morphemes, cross-language ambiguity, and variety of Spanish dialects.

In many embodiments, the techniques described herein can provide a practical application and several technological improvements. The techniques described herein can provide technological improvements to monolingual search engines by adding language detection and user intention prediction functions on top of translating cross-lingual queries, if desired. Further, the techniques disclosed here can provide technological improvements to search engines by handling different types of ambiguity in cross-lingual search queries. Additionally, the techniques described here can provide technological improvements to cross-lingual search query processing by storing the class-translation pairs for future use and thus saving time for translation and/or label (e.g., user intention) determination. These techniques described herein can provide a significant improvement over conventional approaches that automatically translate cross-lingual search queries when a foreign language is detected, which can result in unsatisfactory user experience and potentially lost business when the techniques are applied to an e-Commerce environment.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although processing cross-lingual search query and performing cross-lingual product searches have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. Different functions, algorithms, and/or machine learning modules may be used to impute missing feature values, detect and/or correct label noises, augment data points in a minority class, detect a concept drift, and/or determine the risk scores. Various training datasets can be used for training the machine learning modules described above.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A system comprising:
one or more processors; and
one or more non-transitory computer-readable media storing computing instructions that, when run on the one or more processors, cause the one or more processors to perform:

determining a translatability class label and a class-associated search query for a cross-lingual search query received, via a computer network, from a user device for a user by:
   determining whether a first class-translation pair for the cross-lingual search query exists in a memory module, wherein:
      each class-translation pair in the memory module comprises a respective class label and a respective translation;
   upon determining that the first class-translation pair for the cross-lingual search query exists in the memory module, retrieving the first class-translation pair for the cross-lingual search query from the memory module, wherein:
      the translatability class label for the cross-lingual search query comprises the respective class label for the first class-translation pair; and
      the class-associated search query for the cross-lingual search query comprises the respective translation for the first class-translation pair; and
   upon determining that no class-translation pair for the cross-lingual search query exists in the memory module:
      determining, via a translatability classifier module, the translatability class label for the cross-lingual search query; and
      determining, via a language translator module, the class-associated search query for the cross-lingual search query based on the translatability class label;
   determining search results for the cross-lingual search query based on the translatability class label and the class-associated search query; and
   transmitting, via the computer network, the search results to be displayed on the user device based on the translatability class label.

2. The system in claim 1, wherein:
determining whether the first class-translation pair for the cross-lingual search query exists in the memory module further comprises determining whether the cross-lingual search query is ambiguous based on whether at least one additional class-translation pair for the cross-lingual search query exists in the memory module.

3. The system in claim 2, wherein:
when the cross-lingual search query is determined to be ambiguous:
   determining the search results further comprises determining additional search results based on the respective class label and the respective translation of the at least one additional class-translation pair; and
   transmitting the search results further comprises transmitting, via the computer network, the additional search results to be displayed on the user device separately from the search results.

4. The system in claim 2, wherein:
determining whether the cross-lingual search query is ambiguous further comprises determining an ambiguity type among one or more of potential ambiguity types for the cross-lingual search query; and
the potential ambiguity types comprise a cross-language ambiguity and a second-language-variety ambiguity.

5. The system in claim 4, wherein:
determining the ambiguity type further comprises one or more of:
   determining a respective distance between a first product category for the cross-lingual search query and a second product category for a translated search query for the cross-lingual search query;
   determining a first respective user intention for each of the cross-lingual search query and the translated search query; or
   determining a second respective user intention for each of multiple translations for the cross-lingual search query.

6. The system in claim 1, wherein the computing instructions, when run on the one or more processors, further cause the one or more processors to perform:
upon determining that no class-translation pair for the cross-lingual search query exists in the memory module, before determining the translatability class label, determining whether the cross-lingual search query is ambiguous.

7. The system in claim 1, wherein the computing instructions, when run on the one or more processors, further cause the one or more processors to perform one or more of:
   training the language translator module based on one or more domain-specific corpora; or
   training the translatability classifier module based on a training dataset comprising labeled historical queries, wherein:
      each of the labeled historical queries is labeled based at least in part on respective historical user interactions with a respective query for the each of the labeled historical queries.

8. The system in claim 7, wherein:
the respective historical user interactions with the respective query for each of the labeled historical queries comprise one or more of:
   respective historical purchases associated with the respective query; or
   respective historical clicks on user interface controls associated with a respective label for the each of the labeled historical queries.

9. The system in claim 1, wherein the computing instructions, when run on the one or more processors, further cause the one or more processors to perform:
before determining the translatability class label and the class-associated search query, determining whether the cross-lingual search query is cross-lingual based on one or more of:
   a pre-trained language identifying module; or
   whether the cross-lingual search query comprises at least a second-language token in a domain-specific lexicon.

10. The system in claim 1, wherein one or more of:
when the translatability class label is OptIn:
   determining the class-associated search query for the cross-lingual search query further comprises:
      determining that the class-associated search query comprises the cross-lingual search query;
      using the language translator module to translate, at least in part, the cross-lingual search query from a second language to a primary language; and
      determining that a to-be-displayed translation comprises the cross-lingual search query, as translated; and
   transmitting the search results to be displayed on the user device further comprises transmitting, via the computer network, the search results with an OptIn control element to be displayed on the user device, wherein:

the OptIn control element comprises the to-be-displayed translation; and
the OptIn control element, when activated by the user, is configured to cause a search for the to-be-displayed translation;
when the translatability class label is OptOut:
determining the class-associated search query for the cross-lingual search query comprises:
using the language translator module to translate, at least in part, the cross-lingual search query from the second language to the primary language; and
determining that the class-associated search query comprises the cross-lingual search query, as translated; and
transmitting the search results to be displayed on the user device further comprises transmitting, via the computer network, the search results with an OptOut control element to be displayed on the user device, wherein:
the OptOut control element comprises the cross-lingual search query; and
the OptOut control element, when activated by the user, is configured to cause another search for the cross-lingual search query; or
when the translatability class label is Ignore:
determining the class-associated search query for the cross-lingual search query further comprises determining that the class-associated search query comprises the cross-lingual search query.

11. A method being implemented via execution of computing instructions configured to run at one or more processors and stored at one or more non-transitory computer-readable media, the method comprising: determining a translatability class label and a class-associated search query for a cross-lingual search query received, via a computer network, from a user device for a user, comprising:
determining whether a first class-translation pair for the cross-lingual search query exists in a memory module, wherein:
each class-translation pair in the memory module comprises a respective class label and a respective translation;
upon determining that the first class-translation pair for the cross-lingual search query exists in the memory module, retrieving the first class-translation pair for the cross-lingual search query from the memory module, wherein:
the translatability class label for the cross-lingual search query comprises the respective class label for the first class-translation pair; and
the class-associated search query for the cross-lingual search query comprises the respective translation for the first class-translation pair; and
upon determining that no class-translation pair for the cross-lingual search query exists in the memory module:
determining, via a translatability classifier module, the translatability class label for the cross-lingual search query; and
determining, via a language translator module, the class-associated search query for the cross-lingual search query based on the translatability class label;
determining search results for the cross-lingual search query based on the translatability class label and the class-associated search query; and transmitting, via the computer network, the search results to be displayed on the user device based on the translatability class label.

12. The method in claim 11, wherein:
determining whether the first class-translation pair for the cross-lingual search query exists in the memory module further comprises determining whether the cross-lingual search query is ambiguous based on whether at least one additional class-translation pair for the cross-lingual search query exists in the memory module.

13. The method in claim 12, wherein:
when the cross-lingual search query is determined to be ambiguous:
determining the search results further comprises determining additional search results based on the respective class label and the respective translation of the at least one additional class-translation pair; and
transmitting the search results further comprises transmitting, via the computer network, the additional search results to be displayed on the user device separately from the search results.

14. The method in claim 12, wherein:
determining whether the cross-lingual search query is ambiguous further comprises determining an ambiguity type among one or more of potential ambiguity types for the cross-lingual search query; and
the potential ambiguity types comprise a cross-language ambiguity and a second-language-variety ambiguity.

15. The method in claim 14, wherein:
determining the ambiguity type further comprises one or more of:
determining a respective distance between a first product category for the cross-lingual search query and a second product category for a translated search query for the cross-lingual search query;
determining a first respective user intention for each of the cross-lingual search query and the translated search query; or
determining a second respective user intention for each of multiple translations for the cross-lingual search query.

16. The method in claim 11, further comprising:
upon determining that no class-translation pair for the cross-lingual search query exists in the memory module, before determining the translatability class label, determining whether the cross-lingual search query is ambiguous.

17. The method in claim 11, further comprising one or more of:
training the language translator module based on one or more domain-specific corpora; or
training the translatability classifier module based on a training dataset comprising labeled historical queries, wherein:
each of the labeled historical queries is labeled based at least in part on respective historical user interactions with a respective query for the each of the labeled historical queries.

18. The method in claim 17, wherein:
the respective historical user interactions with the respective query for each of the labeled historical queries comprise one or more of:
respective historical purchases associated with the respective query; or
respective historical clicks on user interface controls associated with a respective label for the each of the labeled historical queries.

19. The method in claim 11, further comprising:
before determining the translatability class label and the class-associated search query, determining whether the cross-lingual search query is cross-lingual based on one or more of:
   a pre-trained language identifying module; or
   whether the cross-lingual search query comprises at least a second-language token in a domain-specific lexicon.

20. The method in claim 11, wherein one or more of:
when the translatability class label is OptIn:
   determining the class-associated search query for the cross-lingual search query further comprises:
      determining that the class-associated search query comprises the cross-lingual search query;
      using the language translator module to translate, at least in part, the cross-lingual search query from a second language to a primary language; and
      determining that a to-be-displayed translation comprises the cross-lingual search query, as translated; and
   transmitting the search results to be displayed on the user device further comprises transmitting, via the computer network, the search results with an OptIn control element to be displayed on the user device, wherein:
      the OptIn control element comprises the to-be-displayed translation; and
      the OptIn control element, when activated by the user, is configured to cause a search for the to-be-displayed translation;
when the translatability class label is OptOut:
   determining the class-associated search query for the cross-lingual search query comprises:
      using the language translator module to translate, at least in part, the cross-lingual search query from the second language to the primary language; and
      determining that the class-associated search query comprises the cross-lingual search query, as translated; and
   transmitting the search results to be displayed on the user device further comprises transmitting, via the computer network, the search results with an OptOut control element to be displayed on the user device, wherein:
      the OptOut control element comprises the cross-lingual search query; and
      the OptOut control element, when activated by the user, is configured to cause another search for the cross-lingual search query; or
when the translatability class label is Ignore:
   determining the class-associated search query for the cross-lingual search query further comprises determining that the class-associated search query comprises the cross-lingual search query.

* * * * *